United States Patent
West

(10) Patent No.: US 6,514,322 B2
(45) Date of Patent: Feb. 4, 2003

(54) SYSTEM FOR SEPARATING AN ENTRAINED IMMISCIBLE LIQUID COMPONENT FROM A WET GAS STREAM

(75) Inventor: Hugh M. West, St. Albert (CA)

(73) Assignee: National Tank Company, Houston, TX (US)

(*) Notice: Subject to any disclaimer, the term of this patent is extended or adjusted under 35 U.S.C. 154(b) by 0 days.

(21) Appl. No.: 09/880,559

(22) Filed: Jun. 13, 2001

(65) Prior Publication Data
US 2003/0000386 A1 Jan. 2, 2003

(51) Int. Cl.$^7$ ................................................ B01D 45/12
(52) U.S. Cl. ........................... 95/269; 55/339; 55/396; 55/457; 96/189
(58) Field of Search ................... 55/338, 339, 396, 55/394, 457; 95/269; 96/188, 189

(56) References Cited

U.S. PATENT DOCUMENTS

| | | |
|---|---|---|
| 1,836,004 A | 12/1931 | Becker |
| 2,808,897 A | 10/1957 | Reinsch et al. |
| 3,296,774 A | 1/1967 | Hoogendoorn et al. |
| 3,498,028 A | 3/1970 | Trouw |
| 3,581,467 A | 6/1971 | Donnelly |
| 3,605,388 A | 9/1971 | Zuiderweg et al. |
| 3,633,342 A * | 1/1972 | Richardson ............... 261/116 |
| 3,662,521 A | 5/1972 | Behar et al. |
| 3,793,812 A * | 2/1974 | Willis ......................... 55/319 |
| 3,930,816 A | 1/1976 | Miczek |
| 4,008,059 A * | 2/1977 | Monson et al. ............ 55/396 |
| 4,128,406 A | 12/1978 | Spevack |
| 4,486,203 A | 12/1984 | Rooker |
| 4,838,906 A | 6/1989 | Kiselev |
| 4,880,451 A | 11/1989 | Konijn |
| 5,145,612 A | 9/1992 | Reay et al. |
| 5,683,629 A | 11/1997 | Konijn |
| 5,714,068 A | 2/1998 | Brown |

* cited by examiner

Primary Examiner—Robert A. Hopkins
(74) Attorney, Agent, or Firm—Gable & Gotwals; Paul H. Johnson

(57) ABSTRACT

A system for separating an entrained immiscible liquid component from a wet gas stream, the system including a vessel having an interior in communication with a wet gas inlet, a gas outlet and a liquid outlet, at least one vortex tube supported within the vessel interior, the vortex tube having an inlet end and an outlet end and a tubular wall having an internal wall surface through which fluids pass as the gas flows between the vessel wet gas inlet and gas outlet, a vortex generator supported within the vortex tube near the inlet end, the vortex generator causing gas within the vortex tube to rotate to thereby cause at least some of the liquid component to be forced against the interior wall surface of the vortex tube by centrifugal action, a circumferentially positioned liquid outlet in the vortex tube downstream of the vortex generator configured to strip liquid and bypass gas from the stream flowing through said vortex tube, stripped liquid and bypass gas entering a central chamber of the vessel and a recycle port in the vortex tube upstream of the vortex generator through which bypass gas flows.

25 Claims, 2 Drawing Sheets

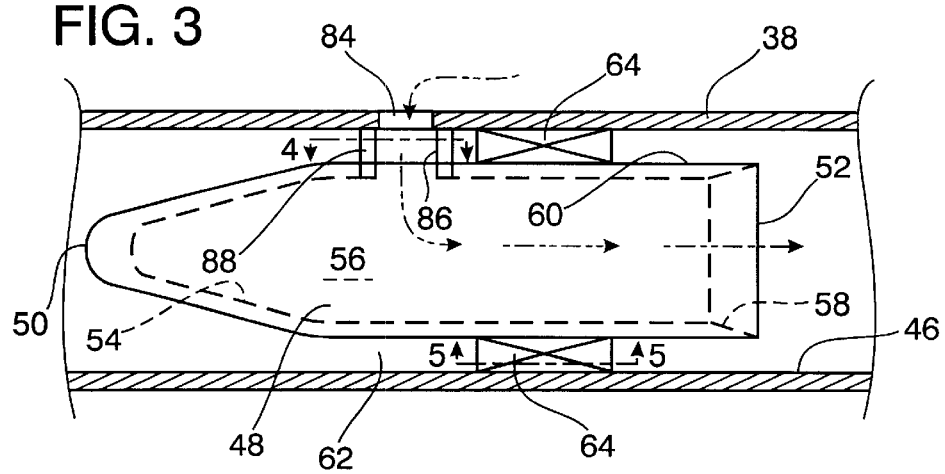
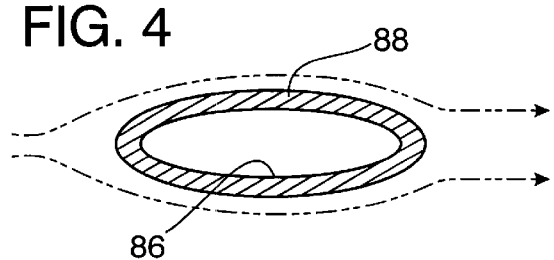
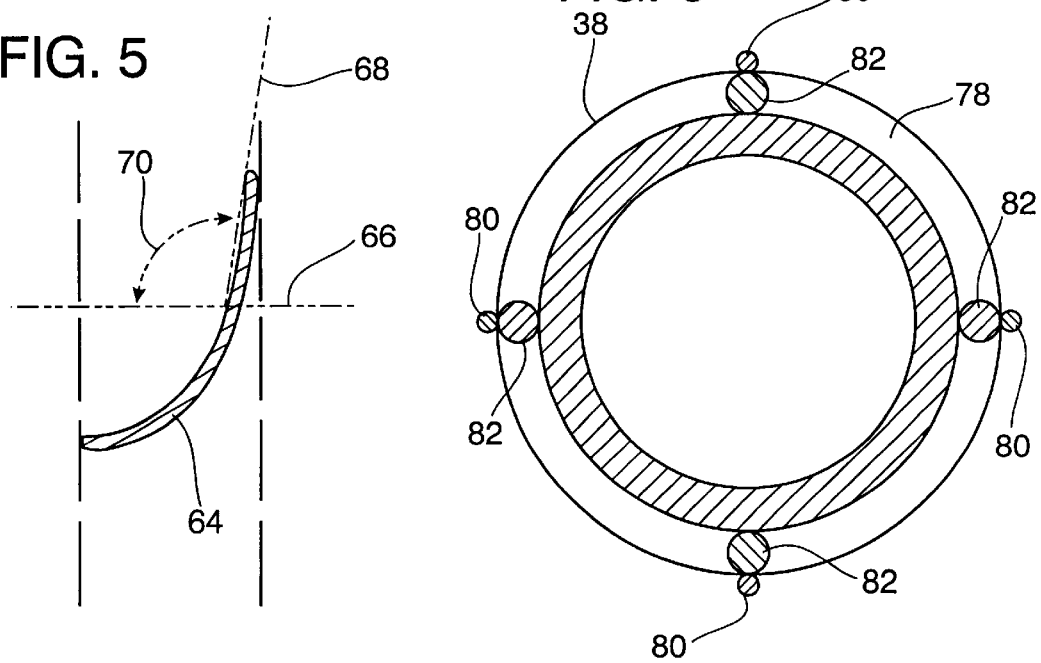

SYSTEM FOR SEPARATING AN ENTRAINED IMMISCIBLE LIQUID COMPONENT FROM A WET GAS STREAM

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

The disclosure herein is for a system, and a method of operating a system, for separating a liquid component from a gas stream in which the liquid component is immiscible—that is, it is not absorbed in the gas.

The invention generally relates to gas/liquid separators which are typically process vessels that are commonly pressurized. The function of the separator system is to segregate immiscible phases of the process stream. Where the process stream is in the form of a gas stream that carries with it immiscible liquid components, the function of the separator is to separate out the liquid components to provide, at the output of the separator, a gas stream which has relatively less entrained liquid. Separators for separating liquid and gas components of the stream are commonly utilized in the oil and gas industry, specifically in oil and gas production, oil refining and gas processing. In addition, gas/liquid separators are utilized in the mining industry, chemical plants, wastewater treatment, pulp and paper plants and pharmaceutical plants.

Separators can be designed to separate: (1) two-phase streams—that is, vapor/liquid streams; (2) three-phase streams—that is, vapor/ organic liquid/aqueous streams; or (3) four-phase streams—that is, vapor/organic liquid/aqueous-liquid/solids.

Industry has developed many types of separators. Most separation depends ultimately on the force of gravity, either natural gravity or created gravity forces such as represented by cyclone separators. Natural gravity is usually accomplished by flowing a stream having immiscible components into a vessel which provides a relatively quiescent environment that allows gravity to act on heavier components of the stream and move them into a downward part of the vessel and accordingly, forcing the lighter components into an upper part of the vessel. Artificial high gravity fields are provided by cyclone separators wherein the stream is subjected to rapid rotation. One type of artificial gravity separators is called a "mono-tube cyclone separator" which utilizes an elongated tube as a rotation chamber, rotation of the stream being accomplished by means of a vortex generator, sometimes referred to as a "spin generator".

A separation system wherein artificially induced gravity is used for augmenting separation in a single tube is commonly referred to as a "mono-tube" cyclone separator. Separators that have one or more of the mono-tube cyclone separators enclosed within a vessel are commonly referred to as "cyclone-tube separators". The disclosure herein relates to a cyclone-tube separator.

For background information relating to the general subject matter of this invention reference may be had to the following previously issued United States patents:

| PATENT NO. | INVENTOR | TITLE |
|---|---|---|
| 1,836,004 | Becker | Apparatus for Treating Gas |
| 2,808,897 | Reinsch et al | Apparatus for Contacting Liquid and Vaporous Materials |
| 3,296,774 | Hoogendorn et al | Gas-Liquid Contactor with Wall Obstructions and Contacting Method |
| 3,498,028 | Trouw | Apparatus for Contacting Liquids and Gases |
| 3,581,467 | Donnelly | Method and Apparatus for Vortical Liquid-Gas Movement |
| 3,605,388 | Zuiderweg et al | Apparatus for Contacting Liquids and Gases |
| 3,662,521 | Behar et al | Device for Reaction Between Liquid Phase and Gaseous Phase |
| 3,930,816 | Miczek | Structure for a Gas and Liquid Contacting Chamber in a Gas Effluent Processing System |
| 4,128,406 | Spevack | Contact Apparatus for Multiphase Processing |
| 4,486,203 | Rooker | Inlet Momentum Absorber for Fluid Separation |
| 4,838,906 | Kiselev | Contact-and-Separating Element |
| 4,880,451 | Konijn | Gas/Liquid Contacting Apparatus |
| 5,145,612 | Reay et al | Apparatus for Mixing Vapor in a Countercurrent Column |
| 5,683,629 | Konijn | Horizontal Tray and Column for Contacting Gas and Liquid |
| 5,714,068 | Brown | Inlet Device for Large Oil Field Separator |

BRIEF SUMMARY OF THE INVENTION

A system is provided for separating an entrained immiscible liquid component from a gas stream. The system employs a vessel. The interior of the vessel is in communication with a wet gas inlet, a gas outlet and a liquid outlet. The term, "wet gas" means the inlet gas stream having a liquid component or components.

At least one vortex tube is supported within the vessel interior. The vortex tube has an inlet end and an outlet end and a tubular wall having an internal surface through which gas passes. The vortex tube(s) are arranged within the vessel so that the wet gas entering the vessel flows through the vortex tube as the gas passes between the vessel wet gas inlet and the gas outlet.

A vortex generator (sometimes referred to as a "spin generator") is supported within the vortex tube near the tube inlet end. The vortex generator causes gas flowing within the vortex tube to rotate rapidly to thereby impart artificial gravity to the stream. This rapid rotation of the gas stream causes the liquid component to be forced against the interior wall of the vortex tube by centrifugal action.

A circumferentially positioned liquid outlet is provided in the vortex tube downstream of the vortex generator. This centrifugal outlet may be in the form of a circumferential slot formed in the vortex tube that can, in one practical embodiment, be achieved by forming the vortex tube of two axially aligned pipe sections wherein the section adjacent the outlet end of the vortex tube is of smaller internal diameter. As the gas stream flows within the vortex tube the liquid component is moved axially along the interior wall of the tube until the liquid encounters the circumferential liquid outlet. The liquid component is passed through the outlet while a substantial portion of the gas in the stream continues within the vortex tube to the tube outlet end.

As entrained liquid that has been forced against the interior wall of the vortex tube passes out through the circumferential liquid outlet a portion of the gas making up the stream also passes through the outlet, the discharged liquid and by-pass gas passing into the interspacial volume interior of the vessel, surrounding the tube.

A recycle port is provided in the vortex tube upstream of the vortex generator. The by-pass gas flowing into the interior of the vessel through the circumferential liquid outlet is drawn back into the interior of the vortex tube through the recycle port to co-mix with the gas stream entering the inlet end of the vortex tube.

In a preferred embodiment of the invention the interior of the separator vessel is compartmented to provide an inlet chamber, an outlet chamber and a middle chamber. Gas flowing out the outlet end of the vortex tube flows into the outlet chamber. This gas is relatively liquid-free compared to the wet gas that flows into the vessel inlet section. Liquid separated from the gas stream that flows out of the vortex tube through the circumferential liquid outlet passes into the middle chamber of the vessel and, by gravitational force, accumulates in a lower portion of the vessel and is withdrawn through the vessel liquid outlet.

In order to induce recirculation of the by-pass gas to flow back into the vortex tube a venturi effect is created in the vortex generator, creating a low static pressure. The venturi is preferably combined with the vortex generator. In the preferred embodiment the venturi/vortex generator is formed using a nosecone member having an external diameter less than the internal diameter of the vortex tube, and an aerodynamic forward end. The vortex generator or spin generator is accomplished by a plurality of spaced apart circumferentially arranged curved blades that extend between the exterior of the nosecone and the interior of the vortex tube. These curved blades are configured to impart a high rate of spin to gas passing through the vortex tube while, as above indicated, the nosecone member achieves venturi action. In the preferred arrangement the nosecone rearward portion is hollow, the hollow area communicating via an open rearward end of the nosecone with the fluid stream passing through the tube. A duct is provided between the by-pass return opening in the vortex tube so that recycled gas passes through the opening in the tube, through the duct and into the interior of the nosecone where it is discharged out the rearward end thereof back into the gas stream.

A better understanding of the invention will be obtained from the following description of the preferred embodiments taken in conjunction with the attached claims and with the attached drawings.

DESCRIPTION OF THE DRAWINGS

FIG. 3 is a fragmentary cross-sectional view of a portion of the vortex tube. FIG. 3 shows a nosecone positioned within a forward portion of the vortex tube—that is, near the inlet end of the vortex tube. This figure shows the nosecone in an elevational exterior view and shows a duct communicating with a by-pass opening in the vortex tube by which by-pass gas can enter into the hollow nosecone. Further, FIG. 3 shows circumferentially arranged, spaced apart, curved blades position in the annular area between the exterior of the nosecone and the interior wall of the vortex tube. These blades impart rapid spinning action to the gas stream to cause the entrained liquids to be expelled towards the interior wall of the vortex tube.

FIG. 4 is a cross-sectional view taken along the line 4—4 of FIG. 3. FIG. 4 is enlarged relative to FIG. 3 and shows the duct by which by-pass gas is conveyed from the exterior of the vortex into the interior of the nosecone.

FIG. 5 is a cross-sectional view taken along the line 5—5 of FIG. 3 of a single curved blade that is positioned between the exterior wall of the nosecone and the interior wall of the vortex tube. A plurality of these curved blades are circumferentially arranged to impart a high rate of spinning action to gas flowing through the vortex tube.

FIG. 6 is a cross-sectional view taken along the line 6—6 of FIG. 2 showing one way by which a circumferential liquid outlet can be provided in the vortex tube.

DETAILED DESCRIPTION OF A PREFERRED EMBODIMENT

Figure 1:
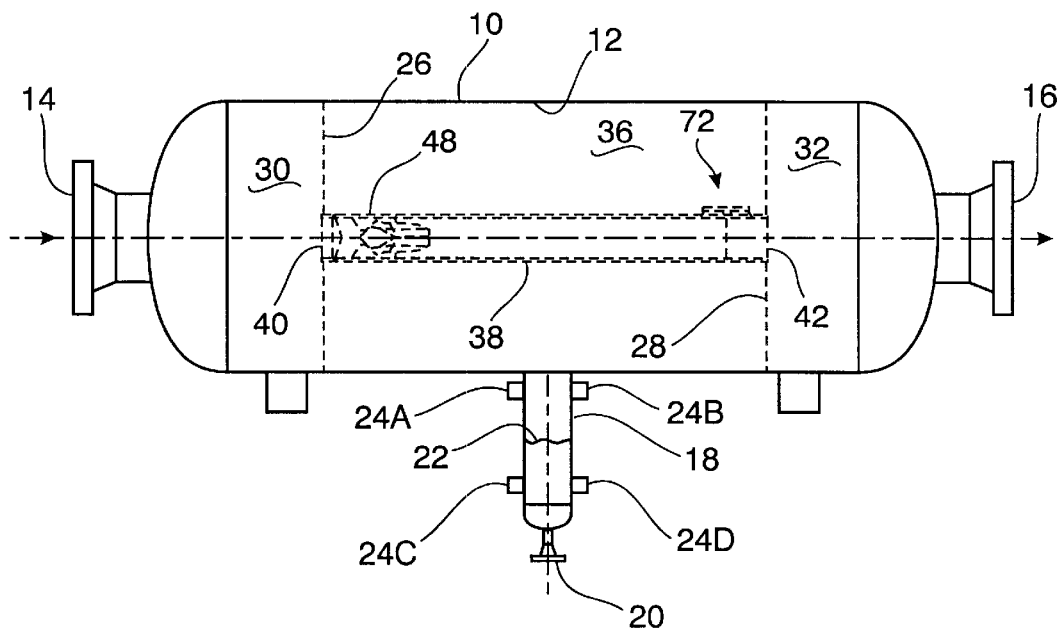
FIG. 1 is an elevational view of a separator vessel that employs the principles of this invention. The separator vessel has a wet gas inlet, a gas outlet and a liquid outlet. Shown in dotted outline within the vessel is a single vortex tube positioned between two tubesheets. Multiple such tubes may be used.

Referring to the drawings and first to FIG. 1, a system for separating an entrained immiscible liquid component from a gas stream is illustrated. The system employs a vessel 10 that, in the illustrated embodiment, is horizontal but that could be vertical. Vessel 10 has an interior wall 12. Communicating with the vessel interior defined by wall 12, is a wet gas inlet 14 and a gas outlet 16. Inlet 14 is described as a "wet gas" inlet to designate that it is the inlet wherein gas having a liquid component entrained therewith enters the vessel. The gas outlet 16 has at least a portion of the entrained liquid separated therefrom.

Extending from the bottom of vessel 10 is a liquid collection chamber 18 having a liquid outlet 20 through which liquid separated from gas flowing through vessel 10 is discharged. In the preferred embodiment of the invention, liquid accumulates to a liquid level 22 that is maintained within chamber 18 to serve as a liquid lock to prevent gas from passing from the interior of the vessel through liquid outlet 20. In order to maintain liquid level 22, liquid controls can be employed, the liquid level controls being indicated by the numerals 24A through 24D. Equipment to provide liquid level control is commonly commercially available and therefore the system for maintaining liquid level 22 within liquid collection chamber 18 is not a part of this invention, and not shown.

Shown in dotted outline in FIG. 1 is a first tubesheet 26 that is adjacent wet gas inlet 14 and, spaced from it, a second tubesheet 28 that is positioned near gas outlet 16. Tubesheets 26 and 28 divide the vessel into three interior compartments—that is, an inlet chamber 30, an outlet chamber 32 and a middle chamber 36. Tubesheets 26 and 28 are impervious to flow. Supported between tubesheets 26 and 28 is a vortex tube 38, the vortex tube having an inlet end 40 and an outlet end 42. There is provided an opening in first tubesheet 26 conforming to vortex tube inlet end 40 and in like manner, an opening in second tubesheet 28 conforming to the vortex tube outlet 42. Wet gas flowing through inlet 14 into inlet chamber 30 must flow through vortex tube(s) 38 to pass into the gas outlet chamber 32.

Vortex tube 38 is an elongated metal tubular member, a section of which is seen in FIG. 3. Vortex tube 38 has an interior wall 46. FIG. 3 shows an internal area of vortex tube 38 that is adjacent tubesheet 26 (not seen in FIG. 3)—that is, an area of vortex tube 38 that is adjacent the tube inlet end 40. Positioned within tube 38 is a nosecone member 48, the nosecone member being shown in exterior view. Nosecone member 48 has a forward end 50 that is configured to provide a streamlined shape. The rearward end 52 of nosecone 48 is blunt and is open—that is, nosecone 48 is hollow providing an interior surface 54 and an interior cavity 56. The interior surface 54 of the nosecone is tapered adjacent rearward end 52, the tapered section being indicated by the numeral 58 to provide a sharp circumferential exit edge at rearward end 52.

The exterior surface 60 of nosecone 48 is less than the interior diameter of the vortex tube interior wall 46 leaving an annular area 62. Spaced within this annular area 62 are a plurality of thin, smooth blades 64. The plurality of blades 64 are circumferentially spaced apart from each other as supported within annular area 62. The cross-sectional shape of the blades is indicated in FIG. 5. As shown in FIG. 5 the shape of each of the blades provides a long wrap and a high exit angle. FIG. 5 has a dotted line 66 representing a linear gas flow path as the gas attempts to pass through the annular area 62 within the vortex tube. That is, line 66 shows the path that gas would take except for the provision of the plurality of blades 64. The shape of each of the blades 64 is such that the flow path of fluids passing annular area 62 is directed at an angle such as indicated by dotted line 68. This illustrates the creation of high exit angle 70. Blades 64 each with a high exit angle provide rapid whirling or spinning action to gas flowing through vortex tube. This whirling action imparted by blades 64 creates an artificial gravity or centrifugal force causing the heavier component of the fluid stream, that is the entrained liquid component and any solids component to be expelled outwardly against the interior wall 46 of the vortex tube. The rapidly swirling centrifugal gas stream flows down the length of vortex 38 towards the open outlet end 42.

Figure 2:
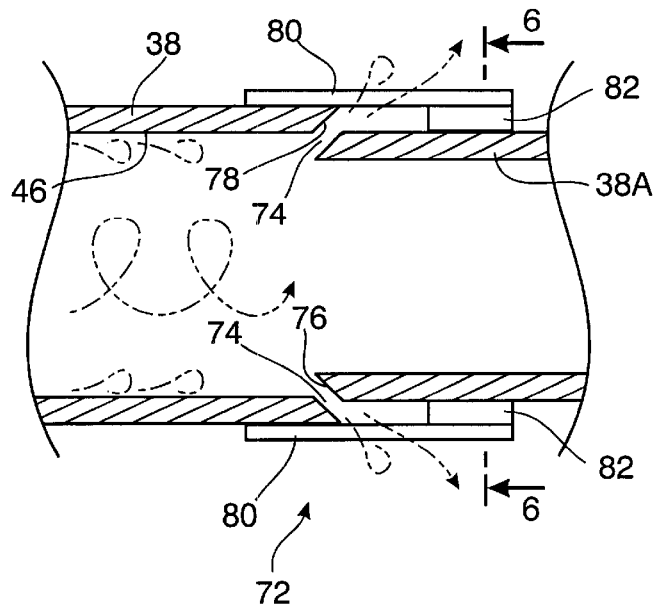
FIG. 2 is enlarged cross-sectional view of a portion of the vortex tube. The cross-sectional shows a portion of the vortex tube adjacent its outlet end and illustrates a circumferential liquid outlet.

Positioned slightly upstream from outlet open end 42 is a circumferentially oriented liquid outlet generally indicated by the numeral 72 and illustrated in detail in the cross-sectional view of FIG. 2. Liquid outlet 72 provides a circumferential opening 74 surrounding or at least substantially surrounding vortex tube 38. The function of circumferential opening 74 is to strip liquid flowing on the vortex tube interior wall 46 as it is moved by gas flow. Circumferential opening 74 can be provided in a variety of ways. In the illustrated embodiment, opening 74 is achieved by employing a supplemental vortex tube portion 38A that extends from liquid outlet 72 to the vortex tube outlet end 42. Tube portion 38A may be of slightly decreased external and internal diameters compared to the main vortex tube 38. Further, the forward end 76 of vortex tube portion 38A is shaped on a bevel and in like manner the outlet end of the main vortex tube 38 is shaped in a complimentary bevel 78 so that the circumferential slot 74 has a radial outward bias with respect to the vortex tube. As gas flows down vortex tube 38 and spins at a rapid rate forcing the liquid component against the interior wall 46 it is stripped off of the wall and passes outwardly through passageway 74 into the middle section 36 of vessel 10. This liquid accumulates and is withdrawn through liquid collection chamber 18.

FIGS. 2 and 6 show one means of supporting vortex tube main portion 38 to the supplemental tube portion 38A. The front end portion of short length rods 80 are welded onto the exterior surface of vortex tube 38 main portion and extend past circumferential opening 74. Short length spacers, which can also be in the form of short length rods 82, are attached, such as by welding, to the external surface of vortex tube supplement portion 38A and also to rods 80. This arrangement holds vortex tube main portion 38 and supplemental portion 38A in axial alignment and yet provides circumferential slot 74 for stripping of liquid from interior wall 46 of vortex tube 38 as a gas stream passes towards the exit end of the vortex tube.

Circumferential opening 74 is configured to strip off liquid but at the same time a portion of the gas stream is free to pass out through opening 74. The passage of a portion of the gas stream outwardly through opening 74 is necessary to carry with it separated liquid. The gas that passes out through circumferential opening 74 is recycled.

Returning to FIG. 3 there is shown a recycle opening 84 in vortex tube 38. There is a sidewall opening in nosecone 48 that is not seen in the drawings, that is in alignment with opening 86 in duct 88. Opening 86 is in alignment with opening 84. Duct 88 is shown in cross-section in FIG. 4. The function of opening 84 and opening 86 through duct 88 is to provide a passageway for the flow of recycled gas from vessel central chamber 36 into the interior of nosecone 48 where it will then flow from the nosecone 48 back into the interior of vortex tube 38. As shown in FIG. 4, the duct 88 is preferably streamlined so as to present minimal obstruction to the flow of the gas stream through vortex tube 38.

Nosecone 48 has two basic functions. First, it provides one means of installing blades 64. That is, the nosecone provides an annular area 62 through which gas flows and provides a space in which to mount blades 64 so that an effective whirling or spinning is imparted to the gas flowing through the tube. In addition, nosecone 48 helps achieve a venturi action. That is, gas flowing in the tube drops in pressure as it passes nosecone 48 due to venturi action. This venturi action results in a pressure within the interior 54 of nosecone 48 that is lower than the pressure within the vessel central chamber 36. This pressure differential, causes gas to flow from central chamber 36 through the passageway created by openings 84 and 86 in duct 88 into the interior of nosecone 48. The gas is drawn by the venturi action of gas flow exterior of the nosecone into the interior of vortex tube 38 where the recirculating gas mixes with the main gas stream entering the vortex tube to ultimately flow into the outlet chamber 32 of vessel 10.

The drawings herein show only a single vortex tube 38 within vessel 10, the vortex tube extending between tubesheets 26 and 28. In actual practice of the invention the normal system may include a plurality of vortex tubes. These tubes can be arranged circumferentially around and spaced from the centrally positioned vortex tube 38 as shown in the drawing. Further, the vortex tubes can be arranged circumferentially within the interior vessel 10 in a manner that does not employ a central vortex tube without departing from the spirit and scope of this disclosure.

Operation of the Separator System

Gas carrying liquid mist enters the inlet section 30 of vessel 10, then flows into tube 38 and through a spin-generator achieved by blades 64. Centrifugal force causes liquids to migrate outwardly and collect around the tube interior wall 46 and gas to move toward outlet chamber 38. In this particular design, a circumferential slot 74 in tube 38 is used to remove the liquid film from inner tube wall 46. To induce the liquid to flow through slot 74, a lower pressure is maintained outside the tube. A small portion of the gas flows through slot 74 with the liquid and is recycled. The lower pressure is created in the spin-generator by venturi action. Gas entering the spin-generator accelerates, creating a low throat pressure. The recycled gas flows back toward this low-pressure source via the space outside tube 38, then through duct 88 in the spin-generator which conducts it to the interior of nosecone 48. It is released inside the hollow nosecone and flows toward its open end 52 through which recycled gas joins the mainstream inside tube 38. Several improvements over existing spin-generators are embodied in this disclosure. Functional improvements to spin-generators illustrated and described in this disclosure include: a) the flowing gas stream is intercepted in a manner that minimizes energy loss; b) rotation is imparted to the gas stream in an efficient manner; c) rotation speed is increased to improve separation; and d) recycled gas is conducted back into the mainstream of gas flow in a streamlined manner.

Some of the unique features of this disclosure are:

(1) the disclosed spin-generator has a relatively long, tapered nosecone 48 with a rounded forward end 50;

(2) the discharge angle of spin imparting blades 64 is made steeper to impart a higher tangential component to the gas discharge velocity;

(3) the wrap of the individual blades 64 is increased, and the number of blades is increased, compared to existing spin-generators, such that there is complete coverage of the flow area by the blades;

(4) blades 64 are made as thin and smooth as practical;

(5) single recirculation duct 88 is used, the duct being separate from blades 64. The outer ) surface contour of recirculation duct 64 is streamlined to minimize resistance to the main stream gas flow; and (6) the bore of the hollow cylindrical nosecone 48 flares at the tail end, by means of a high-angle inside bevel 58, to form a sharp exit edge 52.

Each of these individual design elements and all combinations of them are considered a part of this disclosure.

The effect of these improvements is a device with less pressure drop to the primary flow stream than previously has existed, and a higher exit rotation angle. The lower pressure drop will translate into higher capacity per cyclone tube, and fewer required tubes, and therefore, a smaller diameter vessel 10. The higher rotation angle of blades 64 result in increased g-forces applied to the entrained liquid component for faster phase separation, which shortens the required length of vortex tube 38, and correspondingly a shorter length is required for vessel 10.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for separating an entrained immiscible liquid component from a wet gas stream comprising:

(1) passing said wet gas stream through a vortex tube having an inlet end and an outlet end and tubular wall having an internal wall surface;

(2) causing gas within said vortex tube to rotate to thereby cause at least some of said liquid component to be forced against said interior wall surface of said vortex tube by centrifugal action;

(3) stripping liquid from said vortex tube interior wall surface;

(4) diverting liquid stripped from said vortex tube interior wall surface along with bypass gas out through a circumferential outlet in said vortex tube wall in which said circumferential outlet is formed by an upstream beveled circumferential surface and a downstream beveled circumferential surface, the beveled surfaces being spaced apart from and parallel to each other;

(5) recycling bypass gas back into said vortex tube; and (6) withdrawing liquid stripped through said vortex tube interior wall surface in which said circumferential outlet is formed by an upstream beveled circumferential surface and a downstream beveled circumferential surface, the beveled surfaces being spaced apart from and parallel to each other.

2. A method for separating an entrained immiscible liquid component from a wet gas stream according to claim 1 including the step of:

creating an area of pressure drop within said vortex tube to augment step (5) of recycling bypass gas back into said vortex tube.

3. A method for separating an entrained immiscible liquid component from a wet gas stream according to claim 1 wherein step (2) of causing gas within said vortex tube to rotate is accomplished by a plurality of spaced apart, circumferentially arranged curved blades past which said wet gas stream flows as it flows through said vortex tube.

4. A system for separating an entrained immiscible liquid component from a wet gas stream comprising:

a vessel having a wet gas inlet, a gas outlet and a liquid outlet;

at least one vortex tube supported within said vessel, the vortex tube having an inlet end and an outlet end and an internal surface through which a gas stream passes as the gas flows between said vessel wet gas inlet and gas outlet;

a nose cone positioned within and of external diameter less than the internal diameter of said vortex tube providing an annular area therebetween, the nose cone having a hollow interior with a closed upstream end and an open downstream end, the interior having increased diameters adjacent the downstream end providing a sharp, circumferential exit edge;

a vortex generator supported in said annular area within said vortex tube causing gas to rotate to thereby force at least some of said liquid component against said internal surface of said vortex tube by centrifugal action; and a recycle port in said vortex tube tubular wall and in communication with said nose cone interior through which bypass gas flows.

5. A system for separating an entrained immiscible liquid component from a wet gas stream according to claim 4 wherein said nose cone forms:

a venturi element for creating an area of pressure drop within said vortex tube, said recycle port in said vortex tube having communication with said area of pressure drop by which bypass gas is drawn into said vortex tube.

6. A system for separating an entrained immiscible liquid component from a wet gas stream according to claim 5 including a duct having an inlet end communicating with said recycle port in said vortex tube tubular wall and an outlet end communicating with said nose cone interior through which bypass gas flows from the interior of said vessel to the interior of said vortex tube.

7. A system for separating an entrained immiscible liquid component from a wet gas stream according to claim 4 wherein said vortex generator is in the form of a plurality of spaced apart circumferentially arranged curved blades past which wet gas stream flowing through said vortex tube passes, the blades being configured to impart whirling action to said immiscible liquid component of said gas passing therebetween.

8. A system for separating an entrained immiscible liquid component from a wet gas stream according to claim 7 wherein said plurality of spaced apart, circumferentially arranged, curved blades are supported within said annular area exterior of said nose cone.

9. A system for separating an entrained immiscible liquid component from a wet gas stream according to claim 8 in which said plurality of spaced apart curved blades at least in part support said nose cone within said vortex tube.

10. A system for separating an entrained immiscible liquid component from a wet gas stream according to claim 4 wherein said vessel is elongated, having an inlet portion with which said wet gas inlet communicates and an outlet portion with which said gas outlet communicates and a central portion between said inlet and outlet portions, and include a first wall separating said inlet portion and said central portion and a spaced apart second wall separating said outlet portion and said central portion, each of said first and second walls having a passageway opening therethrough and wherein said vortex tube inlet end is in communication with said opening in said first wall and said outlet end is in communication with said opening in said second wall, said liquid outlet and said recycle port in said vortex tube communicating with said vessel central portion.

11. A system for separating an entrained immiscible liquid component from a wet gas stream according to claim 6 wherein said duct is, in cross-section perpendicular its length, aerodynamically configured.

12. A system for separating an entrained immiscible liquid component from a wet gas stream according to claim 7 wherein each of said curved blades is configured to provide a long wrap and to impart high exit angle to gas passing between said blades.

13. A system for separating an entrained immiscible liquid component from a wet gas stream according to claim 4 wherein said vortex tube is formed of an inlet tubular portion having said nose cone and vortex generator therein an axially supported outlet portion, the inlet and outlet portions being spaced apart providing a circumferential liquid outlet to strip liquid from said vortex tube interior wall, stripped liquid and gas entering said vessel.

14. A system for separating an entrained immiscible liquid component from a wet gas stream according to claim 13 wherein said vortex tube is formed of an inlet tubular portion having said nose cone and said vortex generator therein and an axially supported portion having said outlet end and in which said inlet tubular portion terminates in a circumferential beveled surface and said outlet tubular portion has, opposite its outlet end, a circumferential beveled surface, the beveled surfaces being spaced apart and substantially parallel to each forming a circumferential beveled liquid outlet that augments stripping of liquid moving on said vortex tube inlet portion internal surface.

15. A system for separating an entrained immiscible liquid component from a wet gas stream according to claim 14 wherein said vortex tube outlet portion is of reduced external diameter compared to said inlet portion to further augment stripping of liquid moving on said vortex tube internal surface.

16. A system for separating an entrained immiscible liquid component from a wet gas stream according to claim 15 wherein said vortex tube outlet portion is of external diameter substantially equal to said vortex tube inlet portion internal diameter.

17. A system for separating an entrained immiscible liquid component from a wet gas stream comprising:
   a vessel having an interior in communication with a wet gas inlet, a gas outlet and a liquid outlet;
   at least one vortex tube supported within said vessel interior, the vortex tube having an inlet tubular portion and an axially supported outlet tubular portion, each tubular portion having a tubular wall having an internal surface through which a gas stream passes as the gas flows between said vessel wet gas inlet and gas outlet;
   a vortex generator supported within said vortex tube inlet portion causing gas within said vortex tube inlet portion to rotate to thereby cause at least some of said liquid component to be forced against said interior surface by centrifugal action; and
   said inlet tubular portion terminating in a circumferential beveled surface and said outlet tubular portion having, opposite its outlet end, a circumferential beveled surface, the beveled surfaces being spaced apart and substantially parallel to each other forming a beveled circumferential liquid outlet configured to strip liquid from said vortex tube interior wall, stripped liquid along with bypass gas entering said interior of said vessel.

18. A system for separating an entrained immiscible liquid component from a wet gas stream according to claim 17 wherein said vortex generator includes a nose cone of external diameter less than an internal diameter of said vortex tube providing an annular area therebetween.

19. A system for separating an entrained immiscible liquid component from a wet gas stream according to claim 18 wherein said nose cone has a closed upstream end, an open downstream end and wherein said internal passageway communicates with the open downstream end wherein said duct outlet end communicates with said nose cone interior passageway whereby bypass gas flows into the interior of said vortex tube through said duct, through said nose cone interior passageway and out through said nose cone open downstream end.

20. A system for separating an entrained immiscible liquid component from a wet gas stream according to claim 17 wherein said vortex generator is in the form of a plurality of spaced apart, circumferentially arranged, curved blades past which wet gas stream flowing through said vortex tube passes, the blades being configured to impart whirling action to said entrained immiscible liquid component.

21. A system for separating an entrained immiscible liquid component from a wet gas stream according to claim 18 wherein said vortex generator includes, in addition to said nose cone, a plurality of spaced apart, circumferentially arranged, curved blades supported within said annular area.

22. A system for separating an entrained immiscible liquid component from a wet gas stream according to claim 21 in which said plurality of spaced apart curved blades at least in part support said nose cone within said vortex tube.

23. A system for separating an entrained immiscible liquid component from a wet gas stream according to claim 19 wherein said nose cone interior passageway is defined by increased internal diameters adjacent said open downstream end providing a sharp circumferential exit edge.

24. A system for separating an entrained immiscible liquid component from a wet gas stream according to claim 17 wherein said vessel is elongated, having an inlet portion with which said wet gas inlet communicates and an outlet portion with which said gas outlet communicates and a central portion between said inlet and outlet portions, and include a first wall separating said inlet portion from said central portion and a spaced apart second wall separating said outlet portion from said central portion, each of said first and second walls having a passageway opening therethrough and wherein said vortex tube inlet tubular portion is in communication with said opening in first wall and said vortex tube outlet tubular portion in communication with said opening in said second wall.

25. A system for separating an entrained immiscible liquid component from a wet gas stream according to claim 20 wherein each of said curved blades is configured to provide a long wrap and it impart high exit angle to gas passing between said blades.

* * * * *